(12) United States Patent
Whited et al.

(10) Patent No.: US 6,854,760 B2
(45) Date of Patent: Feb. 15, 2005

(54) CYLINDRICAL PASSENGER AIRBAG MODULE

(75) Inventors: Timothy J. Whited, Waterford, MI (US); Randy Clark, Clearfield, UT (US)

(73) Assignee: Autoliv ASP, Inc., Ogden, UT (US)

(*) Notice: Subject to any disclaimer, the term of this patent is extended or adjusted under 35 U.S.C. 154(b) by 142 days.

(21) Appl. No.: 09/997,554

(22) Filed: Nov. 29, 2001

(65) Prior Publication Data

US 2002/0149178 A1 Oct. 17, 2002

Related U.S. Application Data

(63) Continuation-in-part of application No. 09/829,688, filed on Apr. 11, 2001, now Pat. No. 6,702,318.

(51) Int. Cl.[7] .............................................. B60R 21/16
(52) U.S. Cl. ...................................... 280/732; 736/741
(58) Field of Search ............................. 280/728.2, 736, 280/740, 741, 743.1, 743.2

(56) References Cited

U.S. PATENT DOCUMENTS

| | | | |
|---|---|---|---|
| 4,941,678 A | | 7/1990 | Lauritzen |
| 4,988,119 A | * | 1/1991 | Hartmeyer .................. 141/313 |
| 5,176,400 A | | 1/1993 | McGuire |
| 5,290,059 A | | 3/1994 | Smith |
| 5,431,436 A | | 7/1995 | Mossi |
| 5,505,483 A | * | 4/1996 | Taguchi et al. .......... 280/728.2 |
| 5,511,818 A | | 4/1996 | Jarboe |
| 5,673,930 A | * | 10/1997 | Coleman ................. 280/728.2 |
| 5,678,848 A | * | 10/1997 | Soderquist ............... 280/728.2 |
| 5,762,360 A | * | 6/1998 | Damman et al. ......... 280/728.2 |
| 5,836,608 A | * | 11/1998 | Soderquist et al. ...... 280/728.2 |
| 5,851,023 A | * | 12/1998 | Nagata et al. ........... 280/728.3 |
| 5,860,672 A | * | 1/1999 | Petersen .................. 280/728.2 |
| 5,871,228 A | | 2/1999 | Lindsey |
| 5,979,929 A | * | 11/1999 | Stanger et al. ........... 280/728.2 |
| 6,017,054 A | * | 1/2000 | Magoteaux ............... 280/728.2 |
| 6,042,147 A | * | 3/2000 | Nishijima et al. .......... 280/731 |
| 6,120,056 A | * | 9/2000 | Ryan et al. ............... 280/728.2 |
| 6,126,197 A | * | 10/2000 | Muir et al. .................. 280/741 |
| 6,149,184 A | * | 11/2000 | Ennis et al. .............. 280/728.2 |
| 6,149,192 A | * | 11/2000 | Swann et al. ............... 280/740 |
| 6,155,599 A | * | 12/2000 | Bowers et al. .............. 280/740 |
| 6,302,432 B1 | * | 10/2001 | Magoteaux et al. ...... 280/728.2 |
| 6,328,332 B1 | * | 12/2001 | Schutz ..................... 280/728.2 |
| 6,457,744 B1 | * | 10/2002 | Tonooka ..................... 280/732 |
| 6,474,684 B1 | * | 11/2002 | Ludwig et al. ............. 280/741 |

* cited by examiner

*Primary Examiner*—Ruth Ilan
*Assistant Examiner*—Toan C To
(74) *Attorney, Agent, or Firm*—Sally J. Brown

(57) ABSTRACT

A novel airbag module is described. The airbag module includes an inflatable cushion defining a mouth for receiving inflation fluid. A substantially cylindrical housing is configured to retain the inflatable cushion in a folded state. A disc-shaped inflation fluid source is attached to the housing and is in communication with the inflatable cushion. The inflation fluid source is positioned substantially within the housing and is configured to produce at least about 120 liters of inflation fluid volume. A flared retaining collar is positioned about the inflation fluid source adjacent an inner surface of the inflatable cushion to retain the inflatable cushion in communication with the inflation fluid source.

29 Claims, 4 Drawing Sheets

CYLINDRICAL PASSENGER AIRBAG MODULE

RELATED U.S. APPLICATION

This application is a continuation-in-part of application Ser. No. 09/829,688 filed Apr. 11, 2001 now U.S. Pat. No. 6,702,318 and entitled VEHICLE OCCUPANT RESTRAINT MODULE WITH DISK INFLATOR, which is hereby incorporated herein by reference.

BACKGROUND

1. The Field of the Invention

The present invention is related to a passenger airbag module. More particularly, the present invention is related to a novel passenger airbag module with a disc-shaped inflator and novel cylindrical housing, suitable for use on the passenger side of a vehicle.

2. Technical Background

Inflatable vehicle occupant safety restraint systems, or "airbag restraints," are mandatory on most new vehicles. Airbag restraints commonly contain a collision sensor, an inflator, and an airbag cushion. The airbag cushion is typically housed in an uninflated and folded condition in the steering wheel on the driver's side of a vehicle and in the dashboard on the passenger side of a vehicle. For ease of manufacture, assembly, and installation, many airbag restraint systems come pre-packaged in module form.

In the event of an accident, the collision sensor measures abnormal deceleration and triggers the inflator by means of an electronic signal. Upon receipt of the signal from the collision sensor, the inflator rapidly produces a quantity of inflation fluid which inflates the cushion and protects the passenger from harmful impact with the interior of the car.

Airbag modules were first used on the driver's side of a vehicle to protect the driver from impact with the steering wheel or steering wheel column area. When driver's side airbag modules were applied to the passenger's side of the vehicle however, these known air bag modules suffered many disadvantages.

The existence of a steering wheel and column on the driver's side of a vehicle minimized the space that an inflated airbag needed to fill in order to protect the driver. The space between a passenger and the front panel of a vehicle interior on the passenger side, however, is significantly larger, and a larger airbag is needed. To overcome the problem of inflating larger airbags, larger inflators were used to produce the greater amounts of inflation fluid needed to fill an airbag that would occupy the larger space. The problem with these inflators, however, is that on the passenger side of the vehicle the dashboard or instrument panel provides less space to insert the airbag module and less structure to which the inflator can be attached. Airbag modules with larger elongated inflators do not fit efficiently into the instrument panel on the passenger side of the vehicle.

Another problem with the elongated nature of known inflators is that these inflators extend well beyond the point of attachment of the inflator to the instrument panel. This additional weight on the back side of the instrument panel causes additional torque or pivot forces on the instrument panel which is usually made of plastic. The instrument panel can twist or become detached from the inflator which can negatively effect the trajectory of airbag deployment or create cracks or deformations in the instrument panel.

Most known airbag modules made for front deployment are somewhat bulky and heavy. This may not pose a problem when installing these airbag modules in the steering wheel column because the existing structure of the steering wheel column could support the heavier and bulkier inflators. This support structure, however, is not found on the passenger side of the vehicle. Accordingly, most known airbag modules require additional, and often complex bracketing to support the module within the instrument panel on the passenger side of the vehicle. This additional bracketing results in increased cost in materials and assembly. Further, the additional bracketry takes up space.

Other known passenger side airbag modules include housing members that are susceptible to deformation during inflation. This problem is exacerbated on the passenger side of the vehicle because of the increased combustion forces needed to fill the larger space. This can also negatively affect the trajectory of the airbag's inflation which may cause it to deploy out of position or inefficiently. Yet another problem with known passenger side housings is that they are square or rectangular with the corresponding airbag cushion having corners at transition points that are more susceptible to stress and consequent damage.

Another problem with many known inflators is that the source of inflation fluid is pressurized gas, which requires the inflator to serve as a pressure vessel. This in turn requires these known inflators to use the thicker material needed to safely contain the pressurized inflation fluid. Thicker material increases costs and weight which decreases installation efficiencies.

Accordingly, a need exists for an airbag module with a simplified, smaller, and lighter weight design that can also fully inflate an airbag cushion on the passenger side of the vehicle. A further need exists for an airbag module with a smaller or shallower profile that can efficiently fit into the instrument or front panel of the passenger side of the vehicle. Further a need exists for such an airbag module that does not extend well beyond its point of attachment into the instrument or front panel of the vehicle. Still further, a need exists for such an airbag module that does not need to serve as a pressure vessel, yet that can produce enough inflation fluid volume to sufficiently inflate an airbag on the passenger side of the vehicle. Additionally, a need exists for an airbag restraint module that has a lightweight, sufficiently strong housing to resist deformation upon inflation. Such a novel airbag module is disclosed and claimed herein.

BRIEF SUMMARY AND OBJECTS OF THE INVENTION

The present invention is directed to a novel airbag restraint module suitable for use on the passenger side of the vehicle which overcomes the above-described problems and disadvantages. The airbag restraint module includes an inflatable cushion defining a circular mouth for receiving inflation fluid. The inflatable cushion is positioned within a substantially cylindrical housing in a folded state. The cylindrical configuration of the housing provides hoop strength sufficient to withstand deformation forces inflicted upon the housing during inflation. The cylindrical configuration is efficient use of space and provides strength without the need for additional material.

An inflation fluid source or "inflator" may be attached to the housing and is in communication with the inflatable cushion. The inflator includes a cylindrical portion with a plurality of openings circumferentially spaced about an outer surface of the inflation fluid source through which inflation fluid passes. The inflator also includes an attachment flange which extends orthogonally outward from an outer surface of the inflation fluid source at a point near a proximal end of the inflation fluid source. In a preferred embodiment, the inflator is disk-shaped and is positioned substantially within the housing. Thus, the bulk of the inflator extends outward into the housing from its attachment point and not into the interior of the dashboard panel. In this embodiment the airbag module is more compact and more efficiently uses the limited space within the instrument panel. Further, there is not a significant amount of material behind the point of inflator attachment to the panel which could create unwanted torque or pivoting forces. Additionally, the smaller size requires minimal, if any additional bracketing.

The inflation fluid source includes a pyrotechnic generant that produces inflation fluid upon ignition. Accordingly, the inflator need not contain thicker material which makes the airbag module heavier to contain pressurize gas over a long period. The inflation fluid source in one embodiment produces at least about 80 liters of inflation fluid volume. In a preferred embodiment, the inflation fluid source produces at least about 120 liters of inflation fluid volume. Thus, the inflator of the present invention is lighter and simpler in design, yet can fill the larger airbag required on the passenger side of vehicle.

A retaining collar defining an opening is positioned about the inflation fluid source to retain the inflatable cushion in communication with the inflation fluid source. The retaining collar includes an annular flange flaring outwardly away from the opening for directing the inflation fluid from the inflation fluid source into the cushion.

Thus, it is an advantage of the airbag module of the present invention to provide a simplified smaller and lighter weight design that can fully include an airbag cushion on the passenger side of the vehicle. It is a further advantage to provide such an airbag module as a smaller and shallower profile that can efficiently fit into the instrument panel of the passenger side of the vehicle. It is yet another advantage to provide such an airbag module that does not extend deep within the instrument panel on the passenger side of the vehicle. Another advantage of the airbag module of the present invention is that it does not need to serve as a pressure vessel, and can produce enough inflation fluid to sufficiently inflate the airbag on the passenger side of the vehicle. A further advantage is that the cylindrical housing can efficiently package the cushion and inflation fluid source.

These and other advantages of the present invention will become more fully apparent by examination of the following description of the preferred embodiments and the accompanying drawings.

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
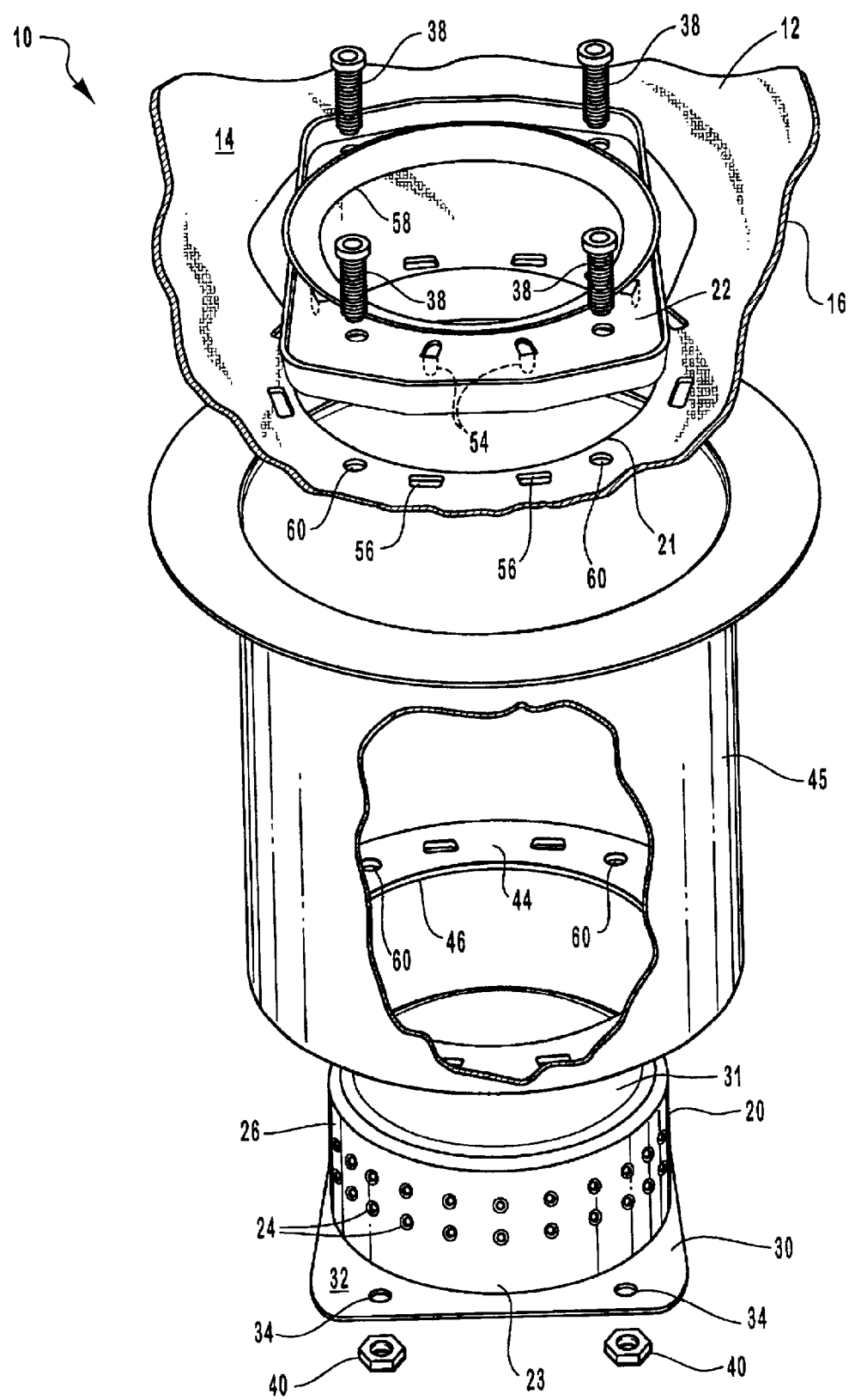
FIG. 1 is an exploded, partially cutaway perspective view of the airbag module of the present invention.

Reference is now made to the Figures wherein like parts are referred to by like numerals throughout. With particular reference to FIG. 1, an airbag module according to the present invention is generally designated at 10. The module 10 includes an inflatable cushion 12 having an inner surface 14 and an outer surface 16. The cushion 12 is capable of receiving inflation fluid 18 (see FIG. 3) from a inflation fluid source 20, or inflator 20. The cushion may define a circular mouth 21, configured to fit about the inflator 20, to facilitate receiving the inflation fluid 18. A retaining collar 22 which defines an opening 58, is positioned adjacent the mouth 21 at the inner surface 14 of the cushion 12. The retaining collar 22 may be secured about the inflator 20 within a housing 45 to retain the inflatable cushion 12 in communication with the inflator 20 and within the housing in a folded state.

The inflator 20 includes an attachment flange 30 extending orthogonally outward from the outer surface 26 of the inflation fluid source. The attachment flange 30 may include a clamping surface 32 to facilitate capturing the cushion 12 between the retaining collar 22 and the attachment flange 30. The attachment flange 30 also includes orifices 34 configured to received a plurality of posts 38 attached to, or configured to engage, the retaining collar 22. The posts 38 of the retaining collar 22 may be integral with the retaining collar 22 or may be separate pieces attached to the retaining collar 22 by means known in the art, including welding, swaging, press fitting, bonding with suitable materials, and the like. The posts 38 may be positioned in any number of configurations to secure the curtain 12 to the inflation fluid source 20. In a presently preferred embodiment, four posts 38 are equally spaced adjacent a circular retaining collar opening 58 which corresponds to the configuration of the mouth 21. The posts 38 correspond to, and fit within, post openings 60 within the cushion 12 and the housing 45 to secure the component parts of the module 10 together. The retaining collar 20 is positioned adjacent the inner surface 14 of the cushion 12 at the mouth 21 and about the outer surface 26 of the inflation fluid source 20. It will be appreciated that the circularly shaped mouth 21 is configured to closely approximate the outer surface 26 of the cylindrical inflator 20. As will be discussed in greater detail below in reference to FIGS. 2 and 3, the posts 38 and orifices 34 facilitate the clamping function of the retaining collar 22, which keeps the cushion 12, and other parts of the module 10 in their proper configuration with the mouth 21 of the cushion 12 about the inflator 22. Attachment means known in the art may be secured to the posts 38. In a preferred embodiment, the four posts 38 are threaded to receive corresponding nuts 40.

The airbag module 10 may also include a mounting base member 44 to which the cushion 12 is attached. In a presently preferred embodiment, the mounting base member 44 is part of the housing 45 for retaining the inflatable cushion 12 in a folded state. The housing 45 may define an opening 46 configured to substantially match the shape of the outer surface 26 of the inflator 20, which, as noted above, is preferably cylindrical. The housing 45 is clamped, along with the mouth 21 of the cushion 12, between the retaining collar 22 and the flange member 30 of the inflator 20. The housing 45 is also cylindrical. It will be appreciated by those of skill in the art that this cylindrical configuration gives the housing 45 hoop strength which protects against deformation of the housing 45 upon inflation. The cylindrical configuration is also devoid of creases and corners, and the symmetrical nature of cylinders facilitates the smooth and even inflation of the cushion 12. Accordingly, the housing 45 does not require thicker material or additional bracketing for added strength, which saves on costs and utilizes less space.

Figure 2:
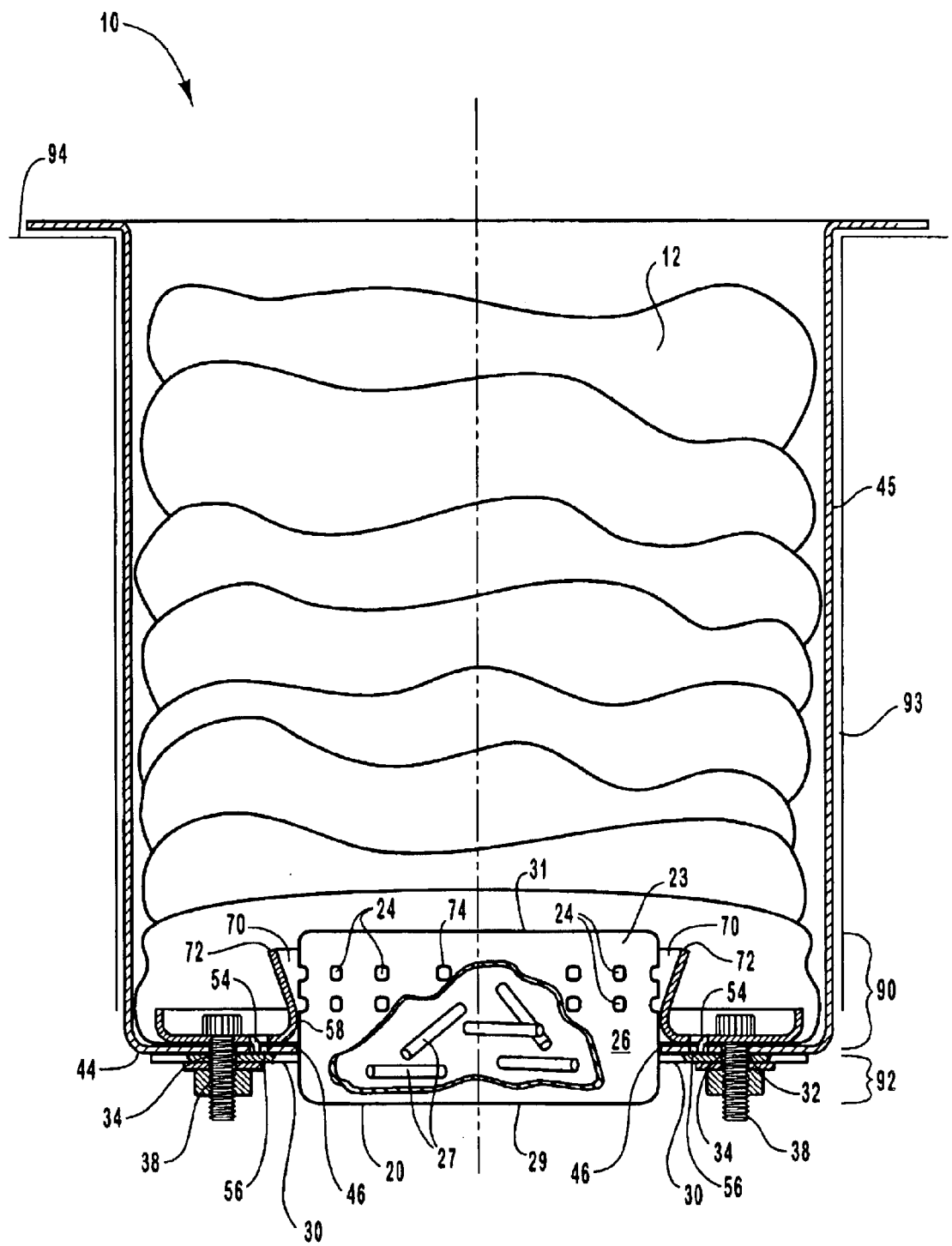
FIG. 2 is a side plan view of the airbag module of FIG. 1 with the cushion in a folded state.
Figure 3:
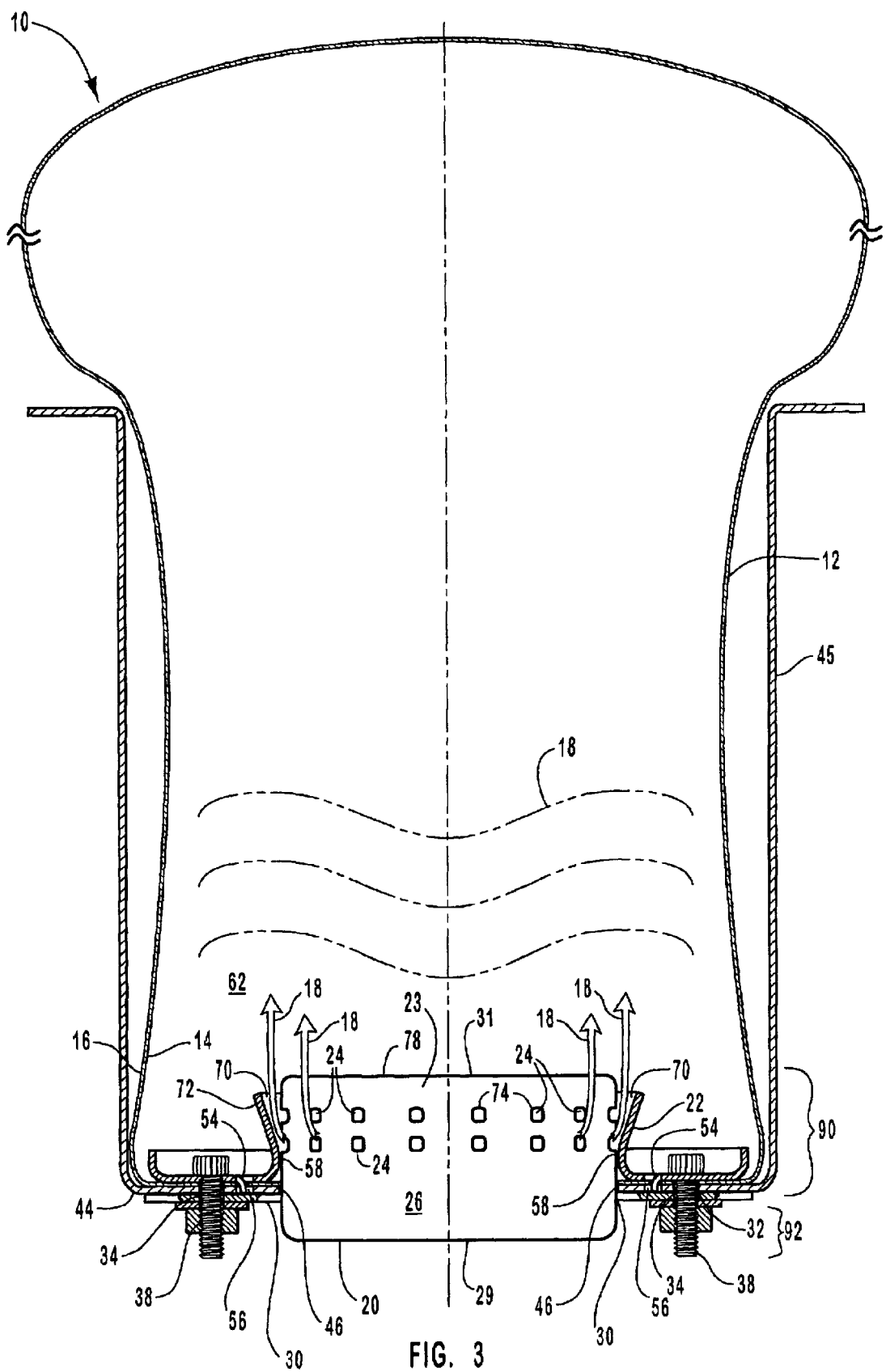
FIG. 3 is a side plan cutaway view of the vehicle occupant restraint module of FIG. 1 with the cushion in a inflated state.

Referring now to FIGS. 2 and 3, the module 10 of the present invention is shown in a pre- and post-inflated state. The inflation fluid source or inflator 20 includes a plurality of openings 24 circumferentially spaced about an outer surface 26 of the inflation fluid source 20 through which the inflation fluid 18 is directed out of the inflator 20. In one embodiment, the openings 24 are spaced about a cylindrical portion 23 of the inflator 20. The inflator 20 is preferably a pyrotechnic assembly in which a measured quantity of generant 27, or pyrotechnic material, is stored. In a presently preferred embodiment, the generant 27 comprises solid fuel pellets known in the art. It will be appreciated that through trial and testing, a known quantity of generant 27 will produce a known range of inflation fluid 18 (FIG. 3). The inflator 20 includes means for activating the generant 27, which in a preferred embodiment are a pair of connector leads (not shown). An initiator (not shown) such as an accelerometer detects improper deceleration which sends an electric signal through the connector leads into the inflator 20. This signal triggers a reaction within the inflator 20 where the generant 27 is ignited and the inflation fluid 18 (FIG. 3) is produced for inflating the cushion 12.

The orifices 34 in the attachment flange 30 align with the post openings 60 in the cushion 12 and housing 45 to receive the posts 38 and clamp the curtain 12 to a position axially below the openings 24 of the inflator 20. In this configuration, the openings 24 direct air into an interior 62 (FIG. 3) of the cushion 12. The retaining collar 22 may include a annular flange 70 which flares outwardly away from the opening 58. The flared flange 70 provides for even radial and rapid inflation of the cushion 12. Thus, there is no need for complex channeling of the inflation fluid 18 into the cushion 12. An outer edge 72 of the flange 70 extends axially beyond a top portion 74 of the fluid source openings 24. Accordingly, inflation fluid 18 exiting laterally outward from the cylindrical outer surface 26 of the inflator 20 will be forced into contact with the flange 70 of the retaining collar 22 which will redirect the flow of inflation fluid 18 upward into the cushion 12. Thus, the flange 70 prevents hot inflation fluid 18 from directly blasting the interior 62 of the cushion 12 as it exits the inflation fluid source 20. The flange 70 also helps direct the inflation fluid 18 axially outward rather than laterally outward which increases the speed and performance of inflation.

The inflator 20 is preferably disc-shaped weighing between about one half kilogram and about three and one half kilograms. In a presently preferred embodiment, it weighs about one kilogram. The inflator 20 is capable of delivering at least 80 liters of inflation fluid, or put another way, of inflating at least an 80 liter cushion 12. In a preferred embodiment, the inflator 20 is capable of providing at least 120 liters of inflation fluid 18 into the cushion 12 in a very short amount of time. Those of skill in the art will appreciate that this amount of fluid 18 can fill larger size airbag cushions 12 which are necessary on the passenger side of the vehicle because there is more volume to fill, owing to the lack of a steering wheel column on the passenger side.

The inflation fluid source includes a proximal end and a distal end. The attachment flange 30 is positioned adjacent a proximal end of the inflation fluid source 20. Thus, a majority of inflation fluid source 20 is positioned substantially within the housing 45. As can be seen in the illustrations, a majority portion 90 of the disc which defines the inflation fluid source 20, (between the distal end 31 and the attachment flange 30) extends into the cylindrical housing 45 from the flange 30. A lesser portion 92 of the disc-shaped inflation fluid source 20 (between the proximal end 29 and the attachment flange 30) extends outward from the flange 30, away from the interior of the housing 45 and into the dashboard. In one preferred embodiment, between about one third and about one seventh of the height of the inflation fluid source 20 extends outward from the attachment flange 30 away from the housing 45 and to the dashboard. In a presently preferred embodiment, about one fifth of the height of the inflation fluid source 20 extends outward from the attachment flange 30 into the dashboard interior 93. Accordingly, there is little material extending beyond the point of attachment of the inflation fluid source 20 to the instrument panel 94 into the interior of the vehicle. Thus, the airbag module uses space efficiently and minimizes any weight behind the point of attachment. Because the flange 30 is the point of attachment of the inflation fluid source 20, and consequently the module 10 itself, to the interior of the vehicle, there is little weight behind to the point of attachment to create unwanted forces upon the instrument panel 94. Additionally, the module 10 has a smaller or shorter profile and more easily fits within the instrument panel 94. Accordingly, the present invention does not require additionally bracketry to support the module 10 within the passenger side of the vehicle.

The cylindrical housing 45, in conjunction with the cylindrical portion 23 of the inflator 20 and the circular mouth 21 of the cushion 12 allow the module 10 to be efficiently packaged. The circular mouth 21 is without corners which strengthens the connection of the cushion 12 to the inflator 20. The cushion 12 is less likely to tear or weaken under the jolt of initial deployment.

Figure 4:
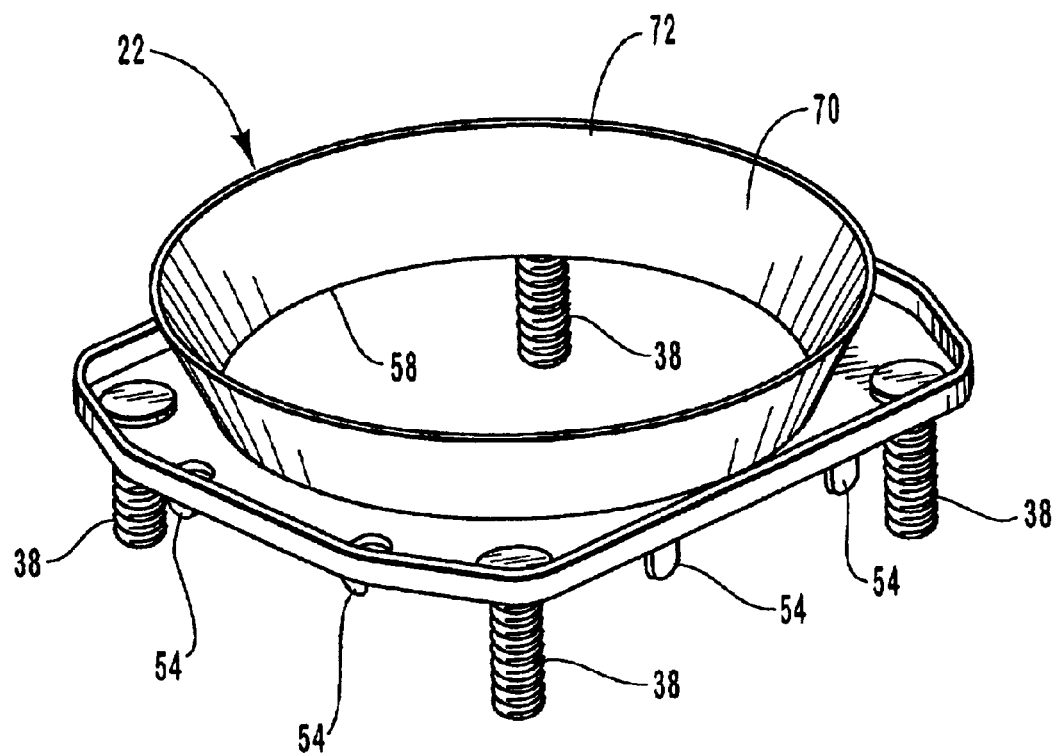
FIG. 4 is a perspective view of a retaining collar of the vehicle occupant restraint module of FIG. 1.

Referring now to FIG. 4, the retaining collar 22 of the preferred invention 10 is illustrated. In one embodiment, the flange 70 is annular and flares outwardly away from opening 58. The outer edge 72 of the flange 70 is positioned within the mouth 21 of the cushion 12. The retaining collar 20 may include positioning extensions 54 configured to engage corresponding openings 56 within the cushion 12 and the housing 45. The openings 56 in the cushion 12 are adjacent to, and spaced about, the mouth 21 and when the retaining collar 20 is secured to the inflator 20, with the extensions 54 seated within the openings 56, the cushion 12 is prevented from movement relative to the retaining collar 20 and the inflator 20. In embodiments where the positioning extensions 54 are positioned within the housing 45, the cushion 12 is also prevented from movement relative to the housing 45. The spaced apart extensions 54 and openings 56 also allow for more uniform retention by the retaining collar 22. In this configuration, there are less possible gaps for the inflation fluid to escape to the outside surface 16 of the cushion 12, rather than directly into the cushion 12.

In one presently preferred embodiment, the positioning extensions 54 are punched out of, and integral with, the material of the retaining collar 22. In other embodiments, the positioning extensions 54 may be separate members attached to the retaining collar 22. The extensions may also be dimples or other types of indentions that impinge upon the fabric of the cushion 12. In these alternative embodiments, positioning extensions 54 need not be broken away from, or punched through the retaining collar 22, thus obviating the need for openings 56 to receive the extensions 54.

It should be appreciated that the apparatus of the present invention is capable of being incorporated in the form of a variety of embodiments, only a few of which have been

What is claimed and desired to be secured by United States Letters Patent is:

1. A passenger side airbag restraint module, comprising:
   an inflatable cushion defining a circular mouth for receiving inflation fluid;
   a substantially cylindrical housing configured to retain the inflatable cushion in a folded state, the housing having a flange extending radially from a top end thereof, the flange shaped to be mounted to an instrument panel on the passenger side of a vehicle;
   an disc-shaped inflation fluid source attached to the housing and in communication with the inflatable cushion, the inflation fluid source having a plurality of openings through which inflation fluid may pass, a majority of the inflation fluid source positioned within the housing, the inflation fluid source further configured to produce at least about 120 liters of inflation fluid volume; and
   a retaining collar positioned about the inflation fluid source and adjacent an inner surface of the inflatable cushion to retain the inflatable cushion in communication with the inflation fluid source.

2. A passenger side airbag restraint module, comprising:
   an inflatable cushion defining a substantially circular mouth for receiving inflation fluid;
   a substantially cylindrical housing shaped to be mounted within a cavity in an instrument panel on the passenger side of a vehicle, the housing configured to retain the inflatable cushion when the cushion is in a folded state;
   an inflation fluid source, having a proximal end and a distal end, attached to the housing and in communication with the inflatable cushion, a majority of the inflation fluid source positioned within the housing; and
   a retaining collar defining an opening, the retaining collar positioned to retain the inflatable cushion in communication with the inflation fluid source.

3. The module of claim 2, wherein the inflation fluid source is disc-shaped.

4. The module of claim 2, wherein the inflation fluid source comprises an attachment flange extending orthogonally outward from an outer surface of the inflation fluid source.

5. The module of claim 4, wherein the attachment flange is positioned adjacent the proximal end of the inflation fluid source.

6. The module of claim 4, wherein a majority of the inflation fluid source is between the distal end of the inflation fluid source and the attachment flange.

7. The module of claim 4, wherein between about one third and about one seventh of the height of the inflation fluid source extends outwardly from the attachment flange.

8. The module of claim 7, wherein about one fifth of the height of the inflation fluid source extends outwardly from the attachment flange.

9. The module of claim 2, wherein the inflation fluid source comprises a plurality of openings spaced about an outer surface of the inflation fluid source through which inflation fluid is directed out of the inflation fluid source.

10. The module of claim 2, wherein the inflation fluid source comprises a pyrotechnic generant that produces inflation fluid upon ignition.

11. The module of claim 2, wherein the inflation fluid source produces at least about 80 liters of inflation fluid volume.

12. The module of claim 11, wherein the inflation fluid source produces at least about 120 liters of inflation fluid volume.

13. The module of claim 2, wherein the inflation fluid source weighs between about one quarter of a kilogram and about four kilograms.

14. The module of claim 13, wherein the inflation fluid source weighs about one kilogram.

15. The module of claim 2, wherein the retaining collar includes an annular flange flaring outwardly away from the opening thereby directing the inflation fluid source into the cushion.

16. The module of claim 2, wherein the inflation fluid source comprises a substantially cylindrical portion configured to fit within the mouth of the inflatable cushion.

17. A passenger side airbag restraint module, comprising:
    an inflatable cushion defining a circular mouth for receiving inflation fluid, the inflatable cushion shaped to be mounted within an instrument panel on the passenger side of a vehicle;
    a substantially cylindrical housing configured to retain the inflatable cushion in a folded state;
    an inflation fluid source having an attachment flange extending substantially orthogonally outward from a an outer surface of the inflation fluid source, the inflation fluid source having a proximal end and a distal end, the inflation fluid source being attached to the housing and in communication with the inflatable cushion, a majority of the inflation fluid source positioned within the housing, the inflation fluid source having a cylindrical portion with openings spaced about an outer surface of the cylindrical portion; and
    a retaining collar defining an opening, the retaining collar positioned about the inflation fluid source and adjacent an inner surface of the inflatable cushion to retain the inflatable cushion in communication with the inflation fluid source.

18. The module of claim 17, wherein the inflation fluid source is positioned substantially within the housing.

19. The module of claim 17, wherein the attachment flange is positioned adjacent the proximal end of the inflation fluid source.

20. The module of claim 17, wherein a majority of the inflation fluid source is between the distal end of the inflation fluid source and the attachment flange.

21. The module of claim 20, wherein between about one third and about one seventh of the height of the inflation fluid source extends outwardly from the attachment flange.

22. The module of claim 21, wherein about one fifth of the height of the inflation fluid source extends outwardly from the attachment flange.

23. The module of claim 22, wherein the inflation fluid source comprises a pyrotechnic generant that produces inflation fluid upon ignition.

24. The module of claim 23, wherein the retaining collar comprises an annular flange, said flange flaring outwardly away from the inflation fluid source.

25. The module of claim 24, wherein an outer edge of the flange extends axially beyond inflation fluid source openings within an outer surface of the inflation fluid source thereby deflecting the inflation fluid as it exits the inflation fluid source.

26. The module of claim 25, wherein the inflation fluid source is configured to produce at least about 80 liters of inflation fluid volume.

27. The module of claim 26, wherein the inflation fluid source is configured to produce at least about 120 liters of inflation fluid volume.

28. The module of claim 27, wherein the inflation fluid source weighs between about one quarter of a kilogram and about four kilograms.

29. The module of claim 28, wherein the inflation fluid source weighs about one kilogram.

* * * * *